United States Patent
Saigo et al.

(10) Patent No.: US 7,673,033 B2
(45) Date of Patent: Mar. 2, 2010

(54) STORAGE UNIT INFORMATION CONTROL SYSTEM FOR USER TERMINAL

(75) Inventors: Kiyokazu Saigo, Yokohama (JP); Yukio Ogawa, Tokyo (JP); Ikuko Kobayashi, Kawasaki (JP); Shinji Kimura, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 12/022,596

(22) Filed: Jan. 30, 2008

(65) Prior Publication Data

US 2008/0307084 A1    Dec. 11, 2008

(30) Foreign Application Priority Data

Jun. 11, 2007    (JP) .............................. 2007-153495

(51) Int. Cl.
*G06F 15/173* (2006.01)

(52) U.S. Cl. ........................ 709/223; 709/224; 709/217; 709/218; 340/825.06; 455/411; 379/191

(58) Field of Classification Search ................. 709/223, 709/224, 217, 218; 304/825.06; 340/825.08; 379/191; 455/411

See application file for complete search history.

(56) References Cited

FOREIGN PATENT DOCUMENTS

| JP | 2001350670 | 12/2001 |
|---|---|---|
| JP | 2002215464 | 8/2002 |
| JP | 2004-032073 | 1/2004 |
| JP | 2005004243 | 1/2005 |
| JP | 2005202918 | 7/2005 |
| JP | 2006344112 | 12/2006 |

*Primary Examiner*—Tammy T Nguyen
(74) *Attorney, Agent, or Firm*—Brundidge & Stanger, P.C.

(57) ABSTRACT

The invention enables the control of the information in a storage unit in a user terminal, prevents data from leaking to unauthorized users and protects information in the user terminal. A management OS manages the input/output to/from a user work OS in the user terminal, identifies a control-triggering condition set by a management server, controls the information in the storage unit storing the user work OS-related information so that information leakage can be prevented, and it also backs up the user work OS-related information to the storage apparatus using the user work OS input/output information.

14 Claims, 12 Drawing Sheets

FIG.4

| TYPE OF CONDITION | DETAILS |
|---|---|
| COMMAND RECEPTION ~401 | ·STATUS MANAGEMENT/REPORT FUNCTION 216 |
| | TIME WHEN A CONTROL COMMAND IS RECEIVED FROM THE MANAGEMENT SERVER |
| PREDETERMINED TIME ~402 | ·TIME MANAGEMENT FUNCTION 217 (·TIME SYNCHRONIZATION FUNCTION 252 IN THE MANAGEMENT SERVER 150) |
| | TIME WHEN IT IS DETECTED THAT THE PREDETERMINED TIME HAS PASSED. (TIME SYNCHRONIZATION IS ACHIEVED WITH THE MANAGEMENT SERVER HAVING A TIME SYNCHRONIZATION FUNCTION.) |
| OFFLINE TIME ~403 | ·STATUS MANAGEMENT/REPORT FUNCTION 216<br>·NETWORK STATUS MANAGEMENT FUNCTION 220 |
| | TIME WHEN THE BREAKDOWN OF COMMUNICATION WITH THE MANAGEMENT SERVER LASTS OVER A PREDETERMINED PERIOD OF TIME (A CHANGE IN THE TIME SETTING IS MONITORED BY A TIME MONITORING FUNCTION.) |
| BATTERY REMAINING AMOUNT ~404 | ·BATTERY MANAGEMENT FUNCTION 218 |
| | TIME WHEN THE BATTERY REMAINING AMOUNT IS BELOW A PREDETERMINED AMOUNT |
| DEVICE REPLACEMENT ~405 | ·HARDWARE MANAGEMENT FUNCTION 219 |
| | TIME WHEN A REPLACEMENT OF A DEVICE (HDD) IS DETECTED |

FIG.5

| TYPE OF CONTROL | DETAILS |
| --- | --- |
| DATA VOLUME DELETION 501 | • DELETION FUNCTION 221<br>• ACCESS CONTROL FUNCTION 222 |
| | DELETE ALL THE DATA VOLUMES OR CONTROL ACCESS TO SOME DATA VOLUMES |
| DELETION IN FILE UNITS 502 | • DELETION FUNCTION 221<br>• ACCESS CONTROL FUNCTION 222 |
| | DELETE FILES OR CONTROL ACCESS TO SOME FILES (IN COOPERATION WITH AN INDIVIDUAL CONTROL FUNCTION IN USER WORK OS) |
| PASSWORD LOCK 503 | • LOCK FUNCTION 223 |
| | REQUEST PASSWORD BEFORE READING OR EDITING |
| ACTIVATION INHIBITION 504 | • ACTIVATION CONTROL FUNCTION 224 |
| | INHIBIT ACTIVATION |
| DELETION OF INFORMATION OTHER THAN BACKUP INFORMATION 505 | • DELETION FUNCTION 221 |
| | DELETE INFORMATION OTHER THAN DIFFERENTIAL BACKUP INFORMATION THAT IS TO BE SENT TO THE STORAGE APPARATUS |

FIG.6

| TYPE OF OPERATION | DETAILS |
| --- | --- |
| REPORT 601 | • STATUS MANAGEMENT/REPORT FUNCTION 216 |
| | REPORT TYPE OF CONTROL TO MANAGEMENT SERVER |

FIG.7

| CONTROL-TRIGGERING CONDITION | TYPE OF CONTROL | TARGET | PERIOD/ THRESHOLD VALUE |
|---|---|---|---|
| COMMAND RECEPTION | DELETION IN FILE UNITS | C:¥CONFIDENTIAL | – |
| PREDETERMINED TIME | DELETION IN FILE UNITS | C:¥CONFIDENTIAL | 07/05/22 13:00:00 |
| OFFLINE TIME | PASSWORD LOCK | C:¥CONFIDENTIAL | 0 [sec] |
| BATTERY REMAINING AMOUNT | DELETION IN FILE UNITS | C:¥CONFIDENTIAL | 10 [%] |
| DEVICE REPLACEMENT | ACTIVATION CONTROL | – | – |

| ID | CONDITION SETTING TIME | CONDITION SATISFACTION | CONTROL EXECUTION TIME | REPORT |
|---|---|---|---|---|
| 00001 | 07/05/15 13:00:00 | SATISFIED | 07/05/20 14:00:00 | DONE |
| 00002 | 07/05/15 13:00:00 | NOT SATISFIED | – | – |
| 00003 | 07/05/15 13:00:00 | NOT SATISFIED | – | – |
| 00004 | 07/05/15 13:00:00 | NOT SATISFIED | – | – |
| 00005 | 07/05/15 13:00:00 | NOT SATISFIED | – | – |

FIG.11

| USER-RELATED INFORMATION 1101 | DEVICE-RELATED INFORMATION 1111 | |
|---|---|---|
| USER NAME 1102 | LATEST UPDATE TIME 1113 | DEVICE ID 1112 |
| TARO, HITACHI | 2007/05/20 14:00:00 | AX000001 |

| DATA-RELATED INFORMATION 1121 | | | |
|---|---|---|---|
| CONTROL-TRIGGERING CONDITION 1122 | TYPE OF CONTROL 1123 | TARGET 1124 | PERIOD/ THRESHOLD VALUE 1125 |
| COMMAND RECEPTION | DELETION IN FILE UNITS | C:¥CONFIDENTIAL | – |
| PREDETERMINED TIME | DELETION IN FILE UNITS | C:¥CONFIDENTIAL | 07/05/22 13:00:00 |
| OFFLINE TIME | PASSWORD LOCK | C:¥CONFIDENTIAL | 0 [sec] |
| BATTERY REMAINING AMOUNT | DELETION IN FILE UNITS | C:¥CONFIDENTIAL | 10 [%] |
| DEVICE REPLACEMENT | ACTIVATION CONTROL | – | – |

| DATA-RELATED INFORMATION 1126 | | | 1129 |
|---|---|---|---|
| CONDITION SETTING TIME | CONDITION SATISFACTION 1127 | REPORT (TIME) 1128 | ID |
| 07/05/15 13:00:00 | SATISFIED | 07/05/20 14:00:00 | 00001 |
| 07/05/15 13:00:00 | NOT SATISFIED | – | 00002 |
| 07/05/15 13:00:00 | – | – | 00003 |
| 07/05/15 13:00:00 | – | – | 00004 |
| 07/05/15 13:00:00 | – | – | 00005 |

FIG.12

| USER-RELATED INFORMATION 1201 | DEVICE-RELATED INFORMATION 1211 | 1212 | 1214 |
|---|---|---|---|
| USER NAME 1202 | LATEST UPDATE TIME 1213 | DEVICE ID | TARGET |
| TARO, HITACHI | 2007/05/20 14:00:00 | AX000001 | ENTIRE USER WORK OS |

| DATA-RELATED INFORMATION 1221 | |
|---|---|
| STORAGE APPARATUS INFORMATION 1222 | RECEIVED MESSAGE (BACKUP IN PROGRESS / CONTROLLED / REQUESTING RESTORATION / UNKNOWN) 1223 |
| IP_XX TARGET_YY | CONTROLLED (ID00001 EXECUTED) |

US 7,673,033 B2

STORAGE UNIT INFORMATION CONTROL SYSTEM FOR USER TERMINAL

CROSS-REFERENCES TO RELATED APPLICATIONS

This application relates to and claims priority from Japanese Patent Application No. 2007-153495, filed on Jun. 11, 2007, the entire disclosure of which is incorporated herein by reference.

BACKGROUND

1. Field of the Invention

The invention relates to the prevention of information leakage from user terminals such as PDAs and mobile PCs.

2. Description of Related Art

Since the implementation of the personal information protection law, information leakage due to theft or loss of user terminals has become a big issue to companies. One of the measures that can be taken after the loss of user terminals is the remote-deletion of the information in the user terminals using management servers, which is disclosed in JP 2004-32073 A.

However, conventional art consists of techniques where the information in a user terminal that is in a state allowing communication with a management server is erased by an application program in the user terminal, and so they are not designed for (1) information control taking into account the situation where the user terminal cannot communicate with the management server, and (2) information storage taking into account the influence on the user after the information in the user terminal is erased.

SUMMARY

According to the invention, a user terminal has a user work OS for user work and a management OS for information control, the management OS manages the input/output to/from the user work OS, backs up the information for the user work OS in a storage apparatus, manages the backup information, judges the designated control-triggering condition, and executes control for the information in the user terminal according to the designated type of control depending on the judgment of the designated control-triggering condition.

With this invention, the information in user terminals can be controlled.

Other aspects and advantages of the invention will be apparent from the following description and the appended claims.

BRIEF DESCRIPTION OF THE DRAWINGS

FIG. 4 shows the types of conditions identified by the condition identification and control function according to an embodiment of the invention.

FIG. 5 shows the types of control performed by the condition identification and control function according to an embodiment of the invention.

FIG. 6 shows the operation the condition identification and control function according to an embodiment of the invention performs after executing control.

FIG. 7 shows a control-triggering condition table in a user terminal according to an embodiment of the invention, storing the specifications for controls executed by the condition identification and control function.

FIG. 11 shows a control-triggering condition management table in a management server according to an embodiment of the invention, for managing the control-triggering conditions.

FIG. 12 shows a storage correspondence management table in the management server according to an embodiment of the invention, for managing the relationship between the storage apparatus and the user terminal.

DETAILED DESCRIPTION OF PREFERRED EMBODIMENTS

An embodiment of the invention will be explained below with reference to the attached drawings.

Embodiment 1

Figure 1:
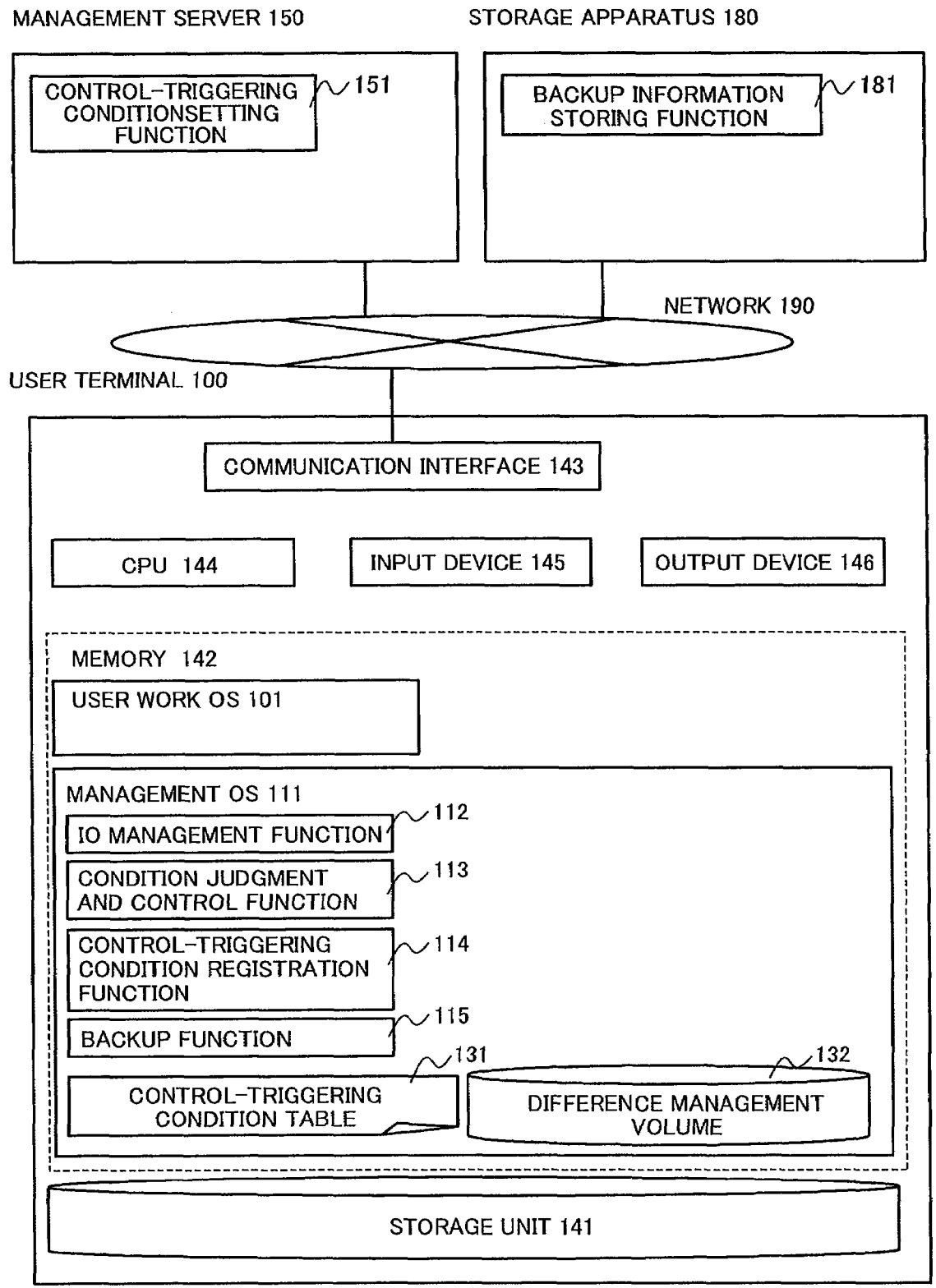
FIG. 1 shows the configurations and functions of each apparatus according to an embodiment of the invention.

FIG. 1 shows the basic configurations and functions of apparatuses according to this embodiment.

As shown in FIG. 1, a system is composed of a user terminal 100, management server 150, storage apparatus 180, and network 190.

The user terminal 100 has a storage unit 141, memory 142, communication interface 143, CPU 144, input device 145, and output device 146.

The storage unit 141 includes disk(s). The disks are, for example, storage devices such as SATA (Serial Advanced Technology Attachment) disk drives. For each disk, one or more logical volumes are set so that various information such as an OS, application programs, and user data can be stored therein.

Alternatively, the storage unit 141 may include a non-volatile semiconductor memory. One example of the non-volatile semiconductor memory is a flash memory. The same effects as those achieved with the above disks may be achieved with flash memory.

The CPU 144 loads a management OS 111—a program stored in the storage unit 141—into the memory 142 and executes it. It also loads a user work OS 101—a program also stored in the storage unit 141—into the memory 142 and executes it. With the user work OS 101, a user does work, such as the execution of stored programs and the storing of data within an area in the storage unit 141 allocated to the user work OS 101, using input units 145 such as a keyboard and mouse. Input/output information for the work is managed by the management OS 111. The specifics of the management will be described below in relation to the functions of the management OS 111.

The management OS 111 has an I/O management function 112, condition judgment and control function 113, control-triggering condition registration function 114, backup function 115, control-triggering condition table 131, and difference management volume 132.

The I/O management function 112 is a function that manages input/output information for the user work OS 101. It manages all the pieces of user work OS-related information stored in the storage unit 141. When any change is made in the user work OS-related information, such as when the user does work on the user work OS 101 or when the system information for the user work OS 101 is updated, information related to that update is stored in the difference management volume 132.

The condition judgment and control function 113 is a function that identifies a control-triggering condition and controls the storage unit 141. With the condition judgment and control function 113, for example, when the control-triggering condition is reception of a command and when the management OS 111 receives a control command from the management server 150, it executes relevant control based on the content of the control command, for example, deletes all the pieces of user work OS-related information stored in the storage unit 141. Details of the control-triggering condition will be described in relation to FIG. 4. Details of the control will be described in relation to FIG. 5.

The control-triggering condition registration function 114 is a function that registers a control-triggering condition in a control-triggering condition table 131 in the management OS 111. A control-triggering condition is set by the management server 150. More specifically, a user of the user terminal 100 or an administrator accesses the management server 150 and sets a control-triggering condition; the management OS 111 in the user terminal 100 receives the control-triggering condition from the management server 150 via the network 190 and registers it in its control-triggering condition table 131. Details of the control-triggering condition table 131 will be described below in relation to FIG. 7. When the management server 150 and the user terminal 100 are not connected to each other via the network 190, the user of the user terminal 100 will be allowed to set a control-triggering condition as long as he/she is authorized as an administrator.

The backup function 115 is a function that sends, to the storage apparatus 180, the user work OS-related information stored in the difference management volume 132 so that the user work OS-related information is backed up in the storage apparatus 180. A backup target may be some or all the files in the user work OS 101, some or all of files in the storage unit 141, or some or all of the files in the memory 142.

The management server 150 has a control-triggering condition setting function 151.

The control-triggering condition setting function 151 is a function that sets a control-triggering condition for the user terminal 100. It cooperates with the control-triggering condition registration function 114 in the management OS 111, and sets a control-triggering condition and sends it to the management OS 111.

The storage apparatus 180 has a backup information storing function 181.

The backup information storing function 181 is a function that receives the backup information sent from the backup function 115 in the management OS 111 and stores it in the storage unit in the storage apparatus 180.

Figure 13:
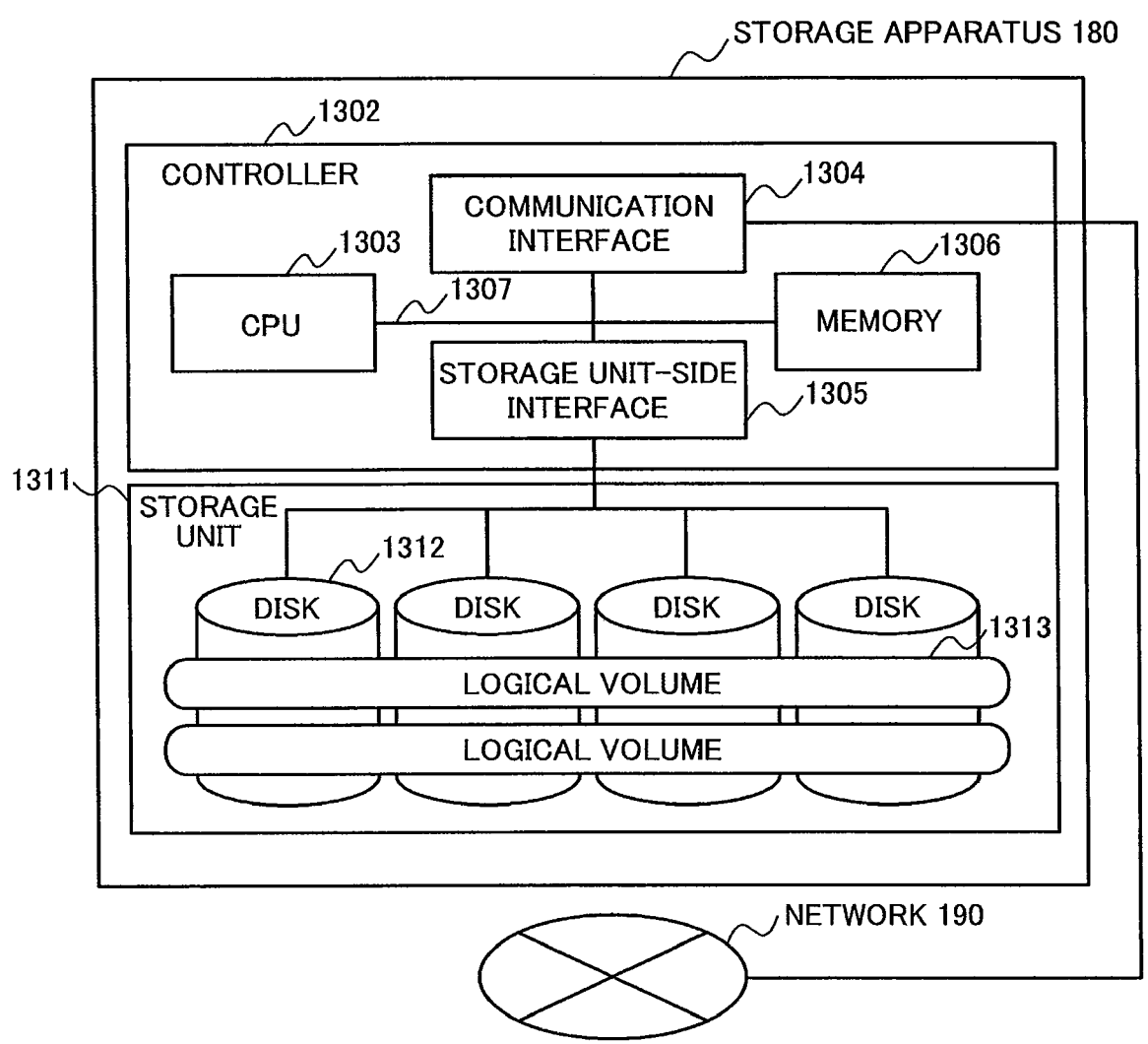
FIG. 13 shows the configuration of the storage apparatus according to an embodiment of the invention.

The configuration of the storage apparatus 180 will be explained below with reference to FIG. 13.

The storage apparatus 180 is mainly composed of a controller 1302 and a storage unit 1311.

The controller 1302 has a CPU 1303, memory 1306, communication interface 1304, and storage unit-side interface 1305. The storage unit 1311 includes a plurality of disks 1312.

The disks 1312 are storage devices such as FC (Fiber Channel) disk drives, SATA (Serial Advanced Technology Attachment) disk drives, PATA (Parallel Advanced Technology Attachment) disk drives, FATA (Fiber Attached Technology Adapted) disk drives, SAS (Serial Attached SCSI) disk drives, or SCSI (Small Computer System Interface) disk drives. The storage unit 111 may alternatively be non-volatile semiconductor memory or it may be composed of a combination of the above disk drives and non-volatile semiconductor memory. One example of non-volatile semiconductor memory is flash memory.

The controller 1302 is capable of controlling the disks 1312 in the storage unit 1311 at a RAID level (e.g., 0, 1, or 5) defined by the so-called RAID system. With the RAID system, more than one disk 1312 is managed as one RAID group where logical volumes 1313—in which the user terminal 100 access—are defined. Each logical volume 1313 is assigned a LUN (Logical Unit Number).

The CPU 1303 is a processor that controls I/O (data read and data write) to/from the disks 1312 in response to a data input/output request from the user terminal 100.

The memory 1306 is, for example, a quickly-accessible volatile memory and stores various micro programs and management tables for the logical volumes 1313.

The communication interface 1304 can be connected to the user terminal 100 via the network 190 and, in its connected state, it sends/receives data and control signals to/from the user terminal 100 based on TCP/IP.

The storage unit (1311)-side interface 1305 is a controller that controls the connection with the disks 1312 so that it controls the data input/output requests to the disks 1312 based on a protocol controlling the disks 1312.

An internal signal line 1307 is, for example, a bus. It connects the CPU 1303, memory 1306, storage unit-side interface 1305, and communication interface 1304 to one another.

Figure 2:
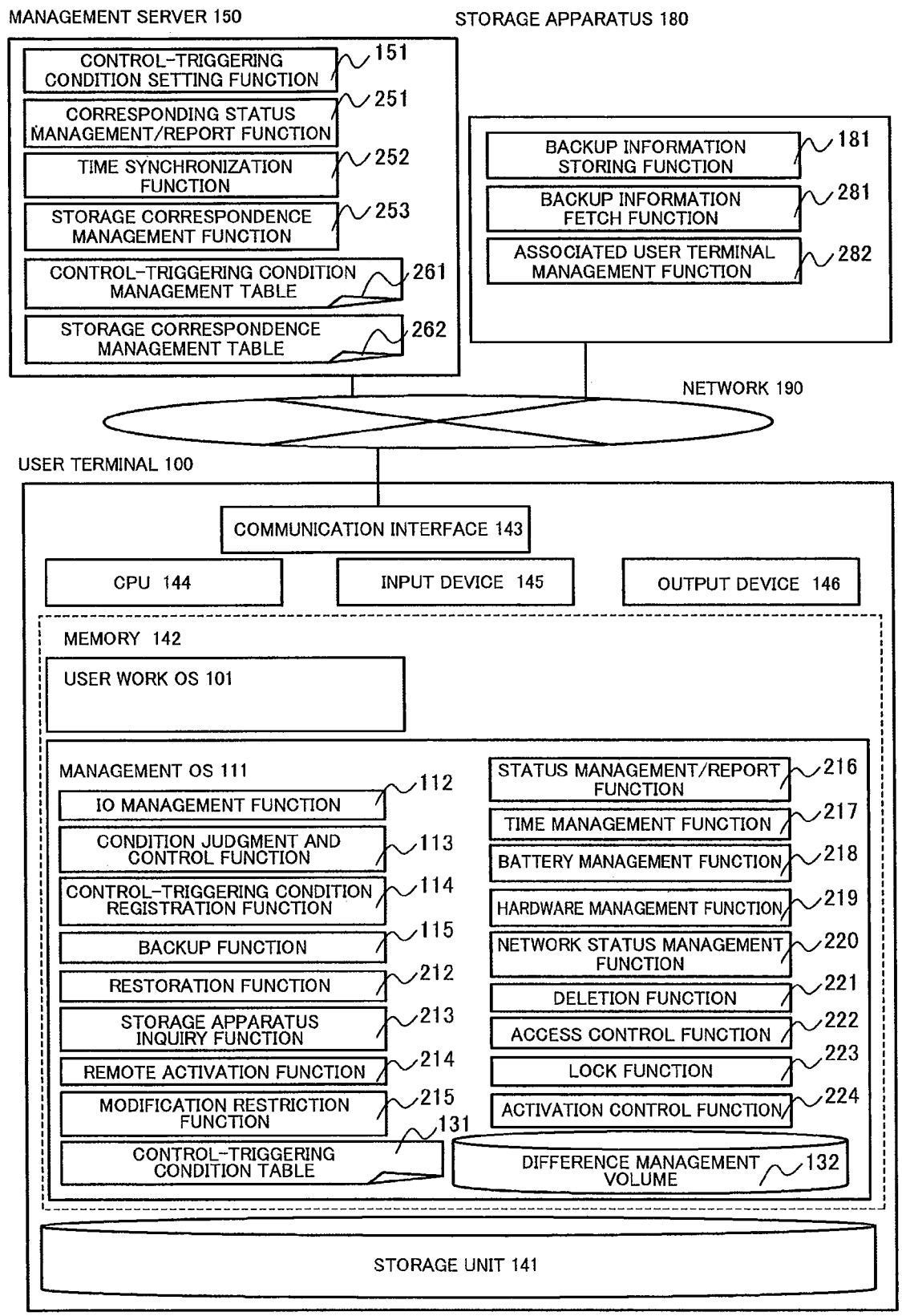
FIG. 2 also shows the configurations and functions of each apparatus according to an embodiment of the invention.

FIG. 2 shows additional functions according to this embodiment.

The management OS 111 may further include some or all of the following functions: a restoration function 212, storage apparatus inquiry function 213, remote activation function 214, modification restriction function 215, status management/report function 216, time management function 217, battery management function 218, hardware management function 219, network status management function 220, deletion function 221, access control function 222, lock function 223, and activation control function 224.

The storage apparatus 180 may further include an associated user terminal management function 282.

The restoration function 212 is a function that obtains the user work OS-related information backup from the storage apparatus 180 and restores the user work OS 101 to its state as of at the backup point in time using that backup. If the backup is the backup of the information for the entire user work OS 101, the user work OS 101 can be restored to its state as of at the backup point in time with the backup.

The storage apparatus inquiry function 213 is a function that makes an inquiry to the management server 150 about the information for the storage apparatus 180 that is supposed to store the backup information for the user terminal 100. On occasions such as when the address information of the storage apparatus 180 changes and so the user work OS-related information cannot be backed up in the storage apparatus 180, if it is the first time to back up the user work OS-related information in the storage apparatus 180, or if the user work OS-related information is restored from the storage apparatus 180 to the user terminal 100, the storage apparatus inquiry function 213 makes an inquiry to the management server 150 and collects the information for the storage apparatus 180. In a configuration where the management OS 111 does not have the storage apparatus inquiry function 213, the information for the storage apparatus 180 is previously set in the user terminal 100.

The remote activation function 214 is a function that activates the user terminal 100 from a remote site when the user terminal 100 is not at hand. Remote activation of the user terminal 100 allows the management OS 111 to perform its functions. In that case, user login is unnecessary.

The modification restriction function 215 is a function that restricts modifications to the settings of the management OS 111 by users other than the administrator. For example, users other than the administrator are not allowed to modify the control-triggering condition table 131 or stop the condition judgment and control function 113.

The status management/report function 216 is a function that sends a message to the management server 150. With this message, the management server 150 knows the operational status of the management OS 111. As a response to the message, the management server 150 may send a control message to the management OS 111.

The time management function 217 is a function that achieves time synchronization. If the management server 150 also has a time synchronization function 252, the management OS 111 achieves time synchronization with the management server 150 and restricts, unless permitted by the administrator, changes to the time settings of the management OS 111.

The battery management function 218 is a function that checks the remaining battery amount in the user terminal 100. It is utilized when the remaining battery amount is selected as a control-triggering condition. Control conditions will be explained below with reference to FIG. 4.

The hardware management function 219 is a function that checks whether or not any change has been made in the hardware environment of the user terminal 100. It is used when device replacement is selected as a control-triggering condition. As mentioned above, control-triggering conditions will be explained below with reference to FIG. 4.

The network status management function 220 is a function that manages the network connection status. It detects a change in the status of connection between the user terminal 100 and the management server 150 as well as between the user terminal 100 and the storage apparatus 180. There may be cases where the backup function 115 and the condition identification and control function 113 are triggered by the detection of a change in the connection status.

The deletion function 221 is a function that executes one specific type of control in place of the condition judgment and control function 113, i.e., deletes the information in the storage unit 141. The utilization of the deletion function 221 will be described below with reference to FIG. 5.

The access control function 222 is a function that executes another specific type of control in place of the condition judgment and control function 113, i.e., restricts some or all of accesses from the user work OS 101 to the information in the storage unit 141. The utilization of the access control function 222 will be described below with reference to FIG. 5.

The lock function 223 is a function that executes still another specific type of control in place of the condition identification and control function 113, i.e., locks with passwords or the like some or all of access to the information in the storage unit 141 when the user does work using the user work OS 101. The utilization of the lock function 223 will be described below with reference to FIG. 5.

The activation control function 224 is a function that executes still another specific type of control in place of the condition judgment and control function 113, i.e., prohibits, when the user tries to activate the user terminal 100, the activation of the user terminal 100 or activates only the management OS 111. The utilization of the activation control function 224 will be described below with reference to FIG. 5.

The associated user terminal management function 282 is a function that manages the correspondence relationships between the data areas in the storage apparatus 180 and the storage unit 141 and memory 142 in the user terminal 100 that have their information stored in those data areas or restore the data in those data areas in the storage apparatus 180 to the storage unit 141 or memory 142.

Figure 3:
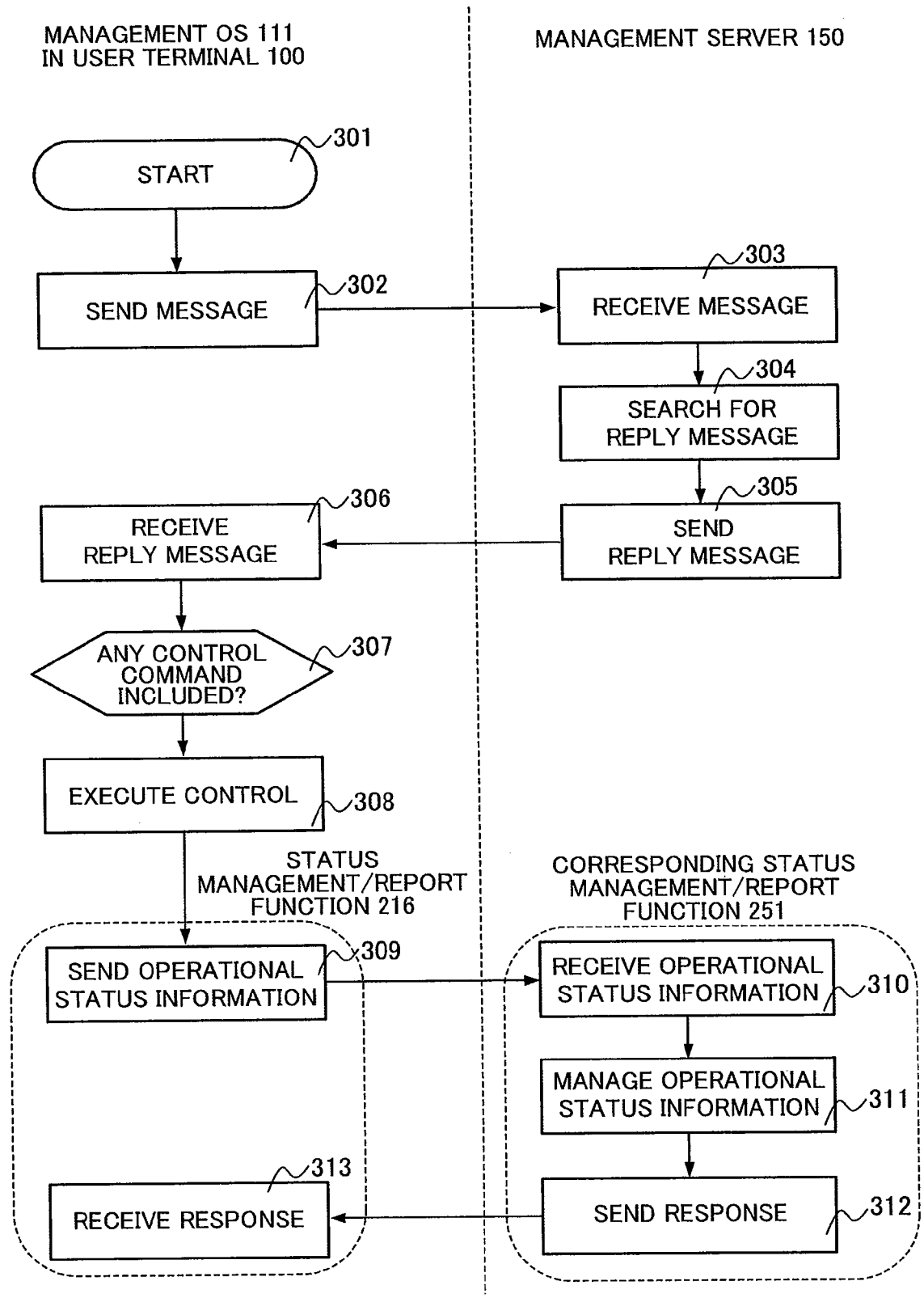
FIG. 3 explains an operation according to an embodiment of the invention performed by a condition identification and control function.

FIG. 3 shows one example of the processing conducted by the management OS 111 in the user terminal 100 by performing the condition identification and control function 113.

In step 302, the management OS 111 sends a message to the management server 150. Sending may be performed immediately after the activation, immediately before the shutdown, at regular time intervals, when the network status management function 220 detects a change in the connection status, or when the backup function 115 completes its tasks.

The management server 150 receives the message in step 303 and checks whether or not the message includes a control request from the management OS 111 in step 304.

In step 305, the management server 150 sends a reply message to the management OS 111.

The management OS 111 receives the reply message in step 306 and checks whether or not the reply message includes a control command in step 307. If the messages includes a control command, the management OS 111 checks that control command with the control-triggering condition table 131 and executes relevant control in step 308. The control-triggering condition table 131 will be explained below with reference to FIG. 7.

When the management OS 111 is not connected to the management server 150 via the network 190 during the execution of the relevant control, the management OS 111 performs the following steps when it detects, after the completion of the relevant control, that itself and the management server 150 are connected to each other via the network 190. In steps 309-313, the management OS 111 performs the status management/report function 216 and the management server 150 performs the corresponding status management/report function 251 so that the management server 150 can know the operational status of the management OS 111.

The management OS 111 sends the information about the type and time of the control that has been executed to the management server 150 in step 309, and the management server 150 receives that information and manages it in its control-triggering condition management table 261. The control-triggering condition management table 261 will be explained below with reference to FIG. 11. The information sent in step 309 may also include the information as to whether or not the files/directories that were subject to the above control had been updated since the latest backup point in time.

FIG. 4 shows the specific examples of the control-triggering conditions.

When the control-triggering condition is set with the command reception 401, upon receipt of a control command, the management OS 111 executes relevant control for the information in the storage unit 141. The sequence explained above in relation to FIG. 3 is based on the premise that a control-triggering condition is reception of a command 401.

When the control-triggering condition is set with a predetermined time 402, the management OS 111 compares the current time and the predetermined time. Then, when it detects that the predetermined time already has passed, executes relevant control for the information in the storage unit 141. The above comparison may be conducted always at regular time intervals, or, conducted at regular time intervals as long as the management OS 111 is not capable of communicating with the management server 150. Regarding the time in the management OS 111, the management OS 111 may achieve, by performing its time management function 217, time synchronization with other devices having time synchronization functions.

When the control-triggering condition is set with an offline time 403, the management OS 111 compares the period of time during which it cannot communicate with the management server 150 and the predetermined offline time. Then, when it detects that the predetermined offline time is exceeded, executes relevant control for the information in the storage unit 141. The state of communication with the management server 150 is checked by the status management/report function 216 or the network status management function 220.

When the control-triggering condition is set with the remaining battery amount 404, the management OS 111 performs the battery management function 218 to check the remaining battery amount of the user terminal 100. Then, when it detects that the current remaining amount is below the predetermined remaining amount, executes relevant control for the information in the storage unit 141.

When the control-triggering condition is set with device replacement 405, the management OS 111 performs the hardware management function 219 to collect device information as of at the time of activation of a device and, when it detects a change in the device information, executes relevant control for the information in the storage unit 141. It may also be possible to set, as a control-triggering condition, detection of a change in the time setting by the time management function 217 in the management OS 111.

FIG. 5 shows the specific types of control performed by the condition identification and control function 113 in the management OS 111 in the user terminal 100.

When the designated type of control is data volume deletion 501, the management OS 111 performs its deletion function 221 to delete all the volumes in the storage unit 141. With this function, the user work OS 101 itself may also be deleted. The access control function 222 may also be performed to inhibit access from the user work OS 101 to specified volumes in the storage unit 141.

An example of the method to specify volumes will be given below.

In the case where the user work OS 101 operates as an application program running on the management OS 111 or as a program loaded by the application program running on the management OS 111 and where the areas related to the user work OS 101 are managed as one or more files/directories in the management OS 111, the condition identification and control function 113 in the management OS 111 designates the files/directories related to the user work OS 101 as control targets when the condition judgment and control function 113 registers a control-triggering condition. When the designated type of control is deletion, the designated files/directories as well as all the user work OS-related information are deleted. When the designated type of control is access inhibition, the setting information for the application program running on the management OS 111 that reads the user work OS 101 is changed and the settings related to the activation of the user work OS 101 are deleted so that the user work OS 101 will not be activated.

In the case where both the user work OS 101 and the management OS 111 operate on the management mechanism of the user terminal 100, the condition judgment and control function 113 in the management OS 111 makes an inquiry to the management mechanism and designates control target volumes in the areas of the user work OS 101. When the designated type of control is deletion, the management OS 111 sends a command to the management mechanism to delete the above volumes and the mechanism deletes them. When the designated type of control is access control, it sends a setting change command to the management mechanism so that the user work OS 101 will not be activated.

When the designated type of control is deletion-in-file-units, the management OS 111 performs the deletion function 221 to delete some files in the storage unit 141 as well as the designated files or directories in the user work OS 101. It may also be possible to perform the access control function 222 to inhibit access from the user work OS 101 to the designated files or directories in the storage unit 141.

File system control is performed by, for example, the following means.

A control application program is installed in the user work OS 101. The control application program reports the file system of the user work OS 101 to the management OS 111 or the above-mentioned management mechanism. Having received the report, the condition identification and control function 113 in the management OS 111 designates control target files. When the designated type of control is deletion, the management OS 111 reports control target file information to the control application program in the user work OS 101, and so the files deleted in the user work OS 101. When the designated type of control is access control, and when access related to the control target files is made, the management OS 111 controls the response to the access, i.e., sends a response that says that the target files do not exist.

The file system control may also be performed by the control application program in the user work OS 101 by communicating directly with the management server 150. The control application program may be activated by the condition identification and control function 113 in the management OS 111 and controlled by setting parameters.

When the designated type of control is password lock 503, the management OS 111 performs the lock function 223 to request passwords for the designated files or directories in the user work OS 101.

When the designated type of control is activation inhibition 504, the management OS 111 performs the activation control function 224 to inhibit the activation of the user terminal 100. In the event the user terminal 100 is powered on, it will not be activated, or only the management OS 111 will be activated.

When the designated type of control is deletion of information other than backup information 505, the management OS 111 performs the deletion function 221 to delete, by referring to the difference management volume 132, of the information stored in the storage unit 141, all the pieces of information with a backup already stored in the storage apparatus 180.

The deletion of information other than backup information is performed in, for example, the following procedure.

The case where the deletion of information other than backup information is performed for all the areas in the user work OS 101 will be explained below. The need for backup is determined by the management OS 111's management of the bits representing the pieces of information in the storage unit 141 that have been updated since the latest backup point in time. Backup is performed by sending only the information for the bits representing the updated pieces of information to the storage apparatus 180. When deleting information other than backup information 505, the bits representing pieces of information that do not have to be backed up, i.e., the bits representing pieces of information that have not been backed up since the latest backup point in time, are deleted. Deletion of information other than backup information is performed for all the areas in the user work OS 101. In the case where the user terminal 110 is connected to the management server 150 and the storage apparatus 180 after the deletion, the backup function 115 backs up the non-backed up information and, for the bits representing the pieces of information that have been backed up, the deletion function 221 deletes that information.

The case where the deletion of information other than backup information is performed for files/directories will be described below. Here, the deletion is performed in cooperation with the control application program in the user work OS 101. The management OS obtains the file names and time stamps managed in the management server 150, checks the file names and time stamps with the files in the user work OS 101, and deletes the files that have been confirmed as already backed up. The checking step may be performed by the control application program in the user work OS 101, or by the condition identification and control function 113 of the management OS 111 upon receipt of a report from the control application program. When the user terminal 110 is connected to the management server 150 and the storage apparatus 180 after the deletion, the backup function 115 backs up the non-backed up information and the deletion function 221 deletes the files that have already been backed up.

Explained below with reference to FIG. 6 is the operation, except for the controls described above, performed by the condition identification and control function 113 in the management OS 111 in the user terminal 100.

After controlling the information in the storage unit 141, the condition identification and control function 113 may include a report function to report the type of control to the management server 150.

The control-triggering condition table 131 in the management OS 111 in the user terminal 100 will be explained below with reference to FIG. 7.

The control-triggering condition table 131 contains fields for control-triggering conditions 701, control types 702, targets 703, and time periods/threshold values 704, and it may also contain fields for some or all of the pieces of information for condition setting times 705, condition satisfaction 706, control execution times 707, reports 708, and IDs 709.

In the control-triggering condition (701) field, information for the control-triggering conditions described in relation to FIG. 4 is registered. The types of control-triggering condition 701 include command reception 401, predetermined time 402, offline time 403, remaining battery amount 404, and device replacement 405.

In the time period/threshold value (704) field, reference values for starting identification of the conditions registered in the control-triggering condition 701 field are registered. For example, when a predetermined time 402 is registered in the control-triggering condition (701) field, the time to execute a control is registered in the time period/threshold value (704) field. When an offline time 403 is registered in the control-triggering condition (701) field, a threshold value for an allowable offline time 403 is registered in the time period/threshold value (704) field. When a remaining battery amount 404 is registered in the control-triggering condition (701) field 701, a threshold value for the remaining battery amount is registered in the time period/threshold value (704) field 704, to determine whether or not to execute the control.

In the type of control (702) field, the information for the types of control performed by the condition identification and control function 113 described in relation to FIG. 5 is registered. Types of control include data volume deletion 501, deletion in file units 502, password lock 503, activation inhibition 504, and deletion of information other than backup information 505.

In the target (703) field, the information for the targets subject to the control type specified in the control type (702) field is registered. For example, when the deletion in file units 502 is registered in the type of control (702) field, deletion target files or directories are registered in the target (703) field. When the password lock 503 is registered in the type of control (702) field, files or directories subject to the password lock are registered in the target (703) field.

In the condition setting time (705) field, information for the time when a control-triggering condition is set is registered.

In the condition satisfaction (706) field, information as to whether or not a control-triggering condition is satisfied is registered. When the control-triggering condition is satisfied, the designated type of control is executed.

In the control execution time (707) field, information for the time when the control is performed is registered.

In the report (708) field, information as to whether or not the information for the executed control has been reported to the management server 150 is registered.

The ID (709) field, identifiers uniquely assigned to the established control-triggering conditions are registered.

Figure 8:
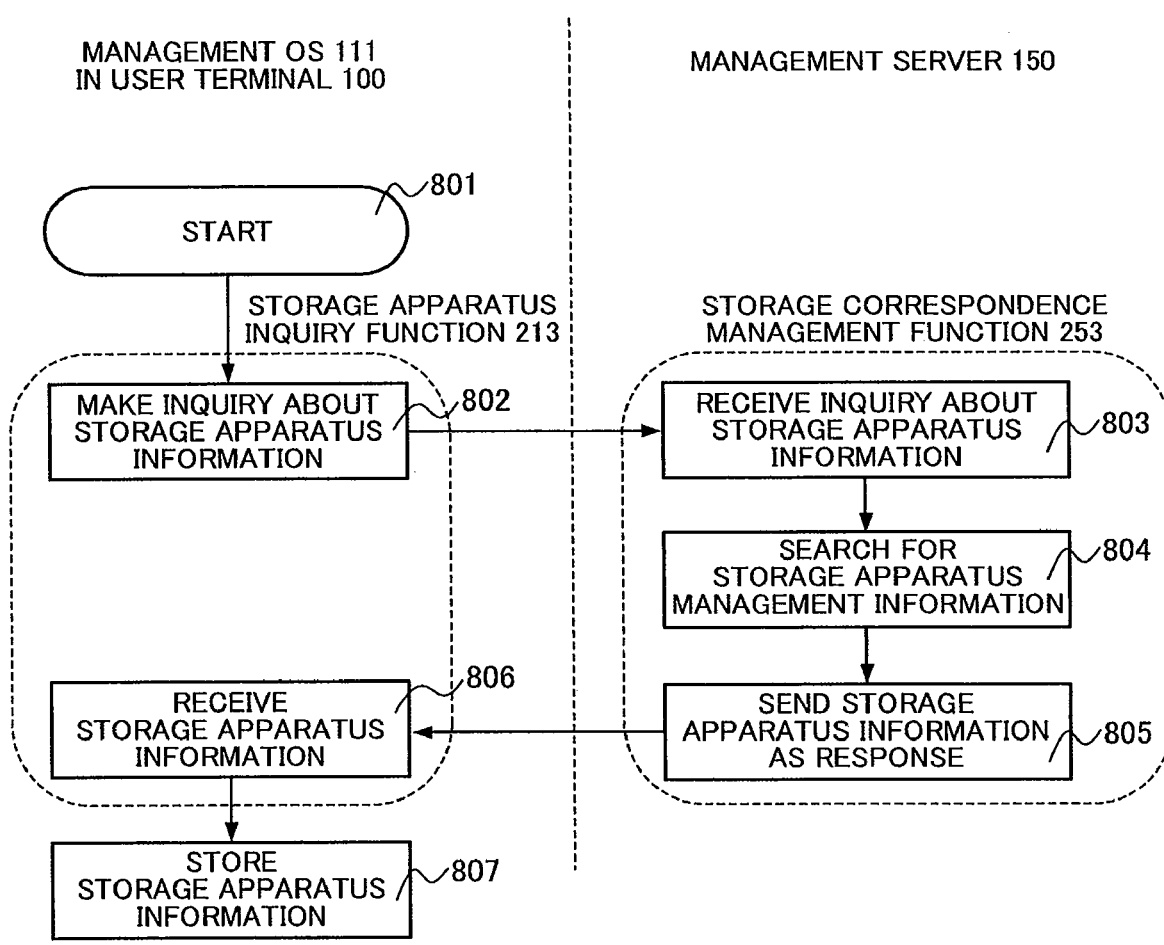
FIG. 8 explains an operation according to an embodiment of the invention performed to back up the data in the user terminal to the storage apparatus.

The backup function 115 performed by the management OS 111 in the user terminal 100 will be explained below with reference to FIGS. 8 and 9.

The management OS starts the sequence of the backup function in step 801. If the management OS 111 does not have the information for the backup destination storage apparatus 180, or if it has it but cannot send backup information to the storage apparatus 180, it executes steps 801-807 before the backup procedure. In contrast, if the management OS 111 has the information for the storage apparatus 180 and can send backup information there, it executes the backup procedure starting with step 901.

In step 802, by performing the storage apparatus inquiry function 213, the management OS 111 makes an inquiry to the management server 150 about the information for the backup destination storage apparatus.

Having received the inquiry from the management OS 111 in step 803, the management server 150 searches the information in a storage correspondence management table 262 in step 804, and sends back the search result, i.e., the information for the storage apparatus 180 as a response in step 805. The storage correspondence management table 262 will be described below with reference to FIG. 12.

Having received the information for the storage apparatus 180 in step 806, the management OS 111 stores that information in step 807.

Figure 9:
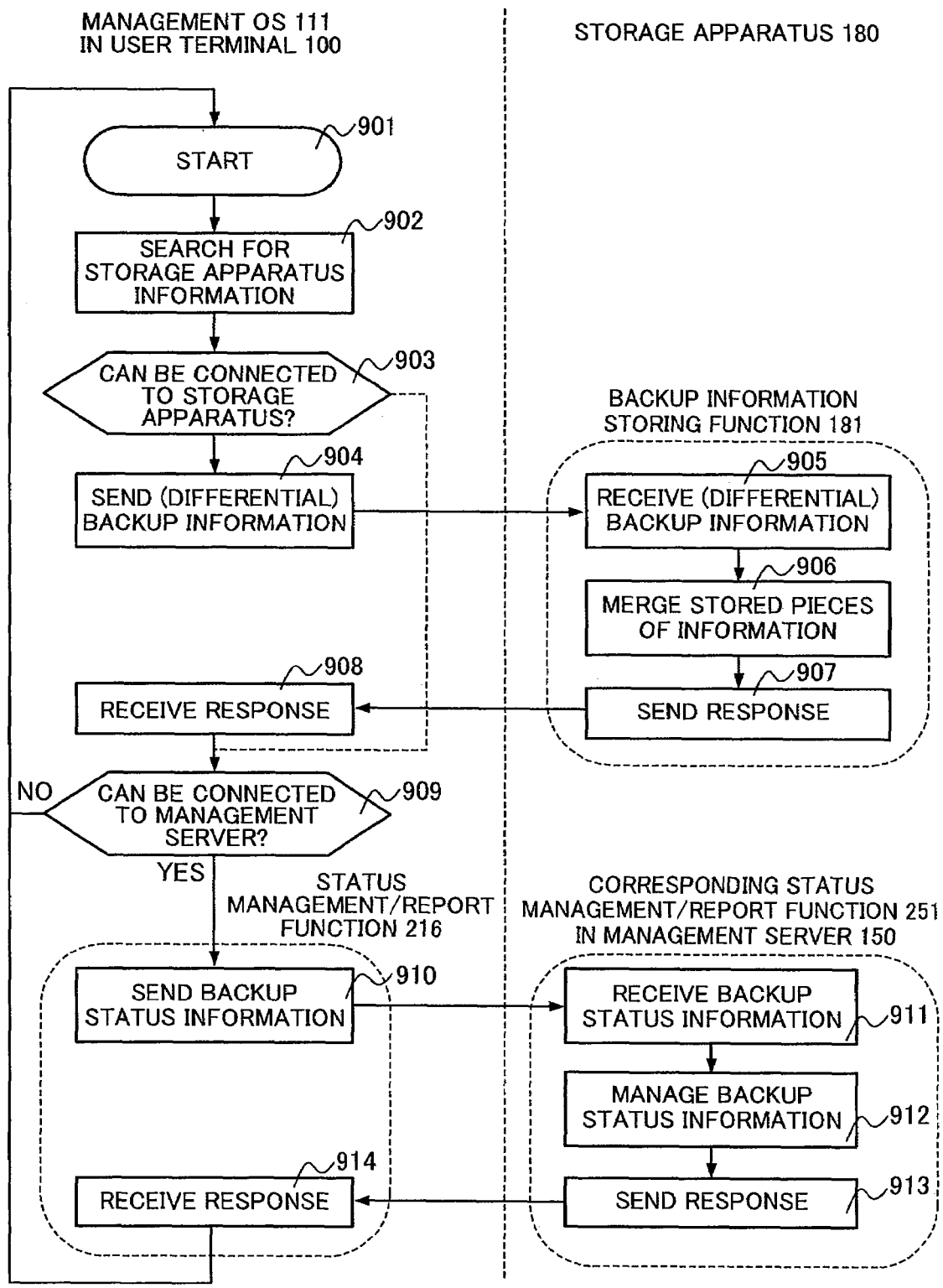
FIG. 9 explains an operation according to an embodiment of the invention performed to back up the data in the user to the storage apparatus.

The management OS 111 then proceeds to the steps shown in FIG. 9 to perform the backup.

If the management OS 111 has the information for the backup destination storage apparatus 180, it starts the backup processing in step 901. The backup may be started at regular time intervals or may be triggered by detection by the network status management function 220 of a change in the network status.

In step 902, the management OS 111 searches for the information for the backup destination storage apparatus 180 it has in itself.

In step 904, the management OS 111 sends backup information to the storage apparatus 180. Some or all of the files in the user work OS 101 in the user terminal 100, some or all of the pieces of information in the storage unit 141, or some or all of the pieces of information in the memory 142 are backed up. The information sent as backup information may be differential information, which is the information concerning the changes made since the latest the backup point in time.

If the management OS 111 can be connected to the storage apparatus 180, the storage apparatus 180 stores, in steps 905 and 906, the backup information sent from the management OS 111 and reports, in step 907, storage completion to the management OS 111 as a response. There may be some cases where the storage apparatus 180 checks whether or not the backup information it receives has been sent from the correct user terminal in step 905. In that case, the correspondence relationships between the volumes in the storage apparatus 180 and the volumes in the user terminal 100 are previously registered in the storage apparatus 180. Alternatively, the correspondence relationships may be registered in the management server 150 so that the storage apparatus 180 makes an inquiry to the management server 150 about the correspondence relationship information.

In step 908, the management OS 111 receives a response from the storage apparatus 180, completing the series of backup steps.

Steps 909-914 belong to an additional sequence followed if the management OS 111 has the status management/report function 216.

In step 910, the management OS 111 sends the backup status information to the management server 150. The information includes the backup time and success/failure of the backup.

Having received the backup status information in step 911, the management server 150 stores it in itself in step 912 and sends a response to the management OS 111 in step 913.

In step 914, the management OS 111 receives the response from the management server 150, completing the performance of the status management/report function 216.

Figure 10:
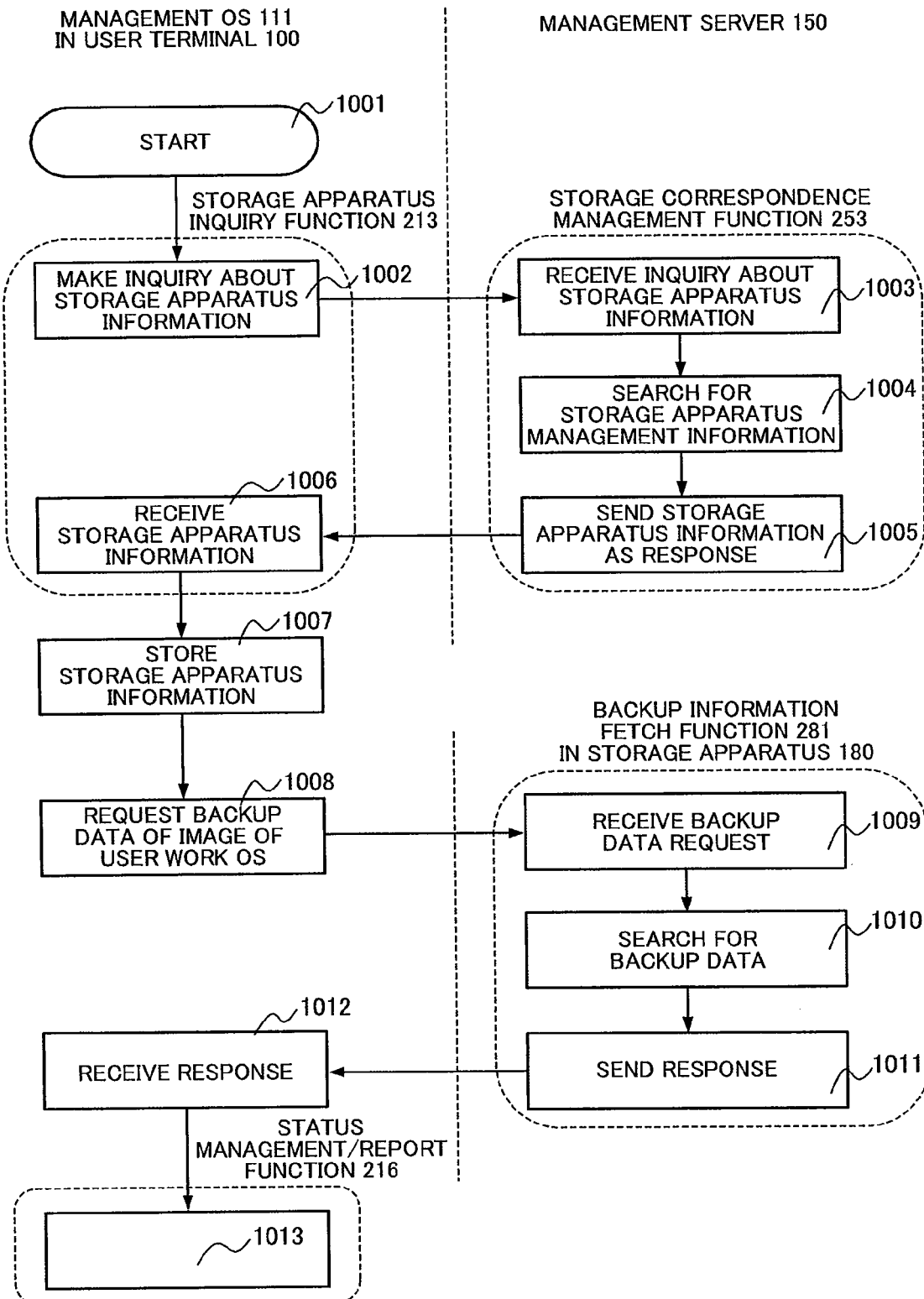
FIG. 10 explains an operation according to an embodiment of the invention performed to restore the backup data in the storage apparatus to the user terminal.

The restoration function 212 performed by the management OS 111 in the user terminal 100 will be explained below with reference to FIG. 10.

The restoration function 212 may start when the user realizes that the control has been performed for the information in the storage unit 141 in the user terminal 100. Alternatively, the restoration function 212 (starting with step 1001) may start when the management server 150 reports, upon activation of the user terminal 100, file control execution completion and a restoration method for the controlled-files to the user.

In steps 1002-1007, the management OS 111 obtains information for the storage apparatus 180 having the restoration target information. More specifically, it makes an inquiry to the storage correspondence management function 253 in the management server 150. In order to refer to the information in the storage correspondence management table 262 in the management server 150, the management OS 111 designates a user name 1202, a device ID 1212 and target 1213, and obtains storage information 1222, which is the information for the backup destination storage apparatus 180. The storage correspondence management table 262 will be described below with reference to FIG. 12. In another configuration, the storage information 1222 may be set by the administrator in the management OS 111 in the user terminal 100 that performs the restoration function 212. Steps 1002-1007 are the same as steps 802-807.

In step 1008, the management OS 111 requests the backup information from the storage apparatus 180. When the entire user work OS 101 is backed up, the image data of the user work OS 101 is backed up, so if the restoration function 212 in the management OS 111 receives that image data, the user work OS 101 can be restored. Another configuration may be possible where the entire file system of the user work OS is backed up and only some files/directories in the user work OS 101 are restored by referring to the entire file system. The file system may be previously backed up. Alternatively, the backup information in the storage apparatus 180 may be migrated to a temporary terminal, the environment in the user work OS 101 may be restored, and only necessary files may be restored to the user terminal 100. When the information for the management OS 111 is also backed up, the user terminal 100 may be activated using a device such as a CD-ROM storing a program having an activation function and restoration function, and the environment of the management OS 111 may be restored using that backup information.

Having received the request in step 1009, the storage apparatus 180 processes the request in step 1010 and sends its backup information to the management OS 111 in step 1011. The storage apparatus 108 may check, in step 1009, whether or not the user terminal 100 that requested the backup information is the correct terminal. This check may be performed by previously registering, in the storage apparatus 180, the correspondence relationships between the volumes in the storage apparatus 180 and the volumes in the user terminal 100, or previously storing those correspondence relationships in the management server 150 so that the storage apparatus 180 makes an inquiry to the management server 150 about the correspondence relationships.

Having received the response in step 1012, the management OS 111 restores the user work OS 101 to its state as of at the latest backup point in time, using the received information.

Step 1013 and the steps following are the same as step 910 and its subsequent steps. These steps belong to an additional sequence performed when the management OS 111 includes the status management/report function 216.

According to this embodiment, because the user terminal information is backed up in the storage apparatus, the user work OS 101 can be restored to its state as of at the backup point in time.

FIG. 11 shows the control-triggering condition management table 261 in the management server 150. The management server 150 stores some or all of the items described below in the table.

The control-triggering condition management table 261 is composed of a user-related information (1101) field, device-related information (1111) field, and data-related information (1121) field.

The user-related information (1101) field has a field for user names 1102.

The user name (1102) field stores the information for the names of the users of the user terminal 100.

The device-related information (1111) field is composed of fields for device IDs 1112 and latest update times 1113.

A device ID 1112 is the identifier for a device.

The latest update time (1113) field stores the information for the time of the latest communication between the user terminal 100 having the device ID 1112 and the management server 150.

The data-related information (1121) field is composed of fields for control-triggering conditions 1122, control types 1123, targets 1124, time periods/threshold values 1125, condition setting times 1126, condition satisfaction 1127, report (times) 1128, and IDs 1129.

The data-related information (1121) field has the same content as the control-triggering condition table 131 shown in FIG. 7.

FIG. 12 shows the storage correspondence management table 262 in the management server 150. The management server stores some or all of the items described below in the table.

The storage correspondence management table 262 is composed of a user-related information (1201) field, device-related information (1211) field, and data-related information (1221) field.

The user-related information (1201) has a field for user names 1202.

The user name 1202 is the same as the user name 1102.

The device-related information (1211) field is composed of a device ID (1212) field, latest update time (1213) field, and target (1214) field.

The device ID 1212 is the same as the device ID 1112.

The latest update time 1213 is the same as the latest update time 1113.

The target 1214 represents the location of information in the user terminal 100 that is going to be backed up.

The data-related information (1221) field is composed of a storage-related information (1222) field and received message (1223) field.

The storage-related information 1222 is information for the backup destination storage apparatus 180.

The received messages (1223) field stores the information for the status of the device identified by the device ID 1212.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system comprising:
a user terminal comprising, a processor, a memory, and a storage unit configured to store information regarding a user work OS (operating system) and a management OS;
a management server connected to the user terminal via a network;
a storage apparatus connected to the management server via the network,
wherein the management OS comprises:
an I/O (input/output) management module for:
managing input/output information for the user work OS,
relaying the input/output information to the storage unit, and
managing information necessary for backing up the input/output information in a differential management volume;
a condition identification and control module for controlling the information the information in the storage unit when a predetermined condition is satisfied;
a control-triggering condition registration module for registering the condition in a control-triggering condition table in the management OS; and
a backup module for backing up, based on the information in the difference management volume, the input/output information to the storage apparatus,
wherein the management server has a control-triggering condition setting module for cooperating with the control-triggering condition registration function in the management OS and sets a control-triggering condition in the management OS,
wherein the storage apparatus has a backup information storing module for storing the backup information sent from the user terminal, and
wherein, with the condition judgement and control module, in the situation where the management server and the user terminal are connected to each other via the network and where the management OS has registered, as a control-triggering condition, a threshold value for the remaining battery amount in the user terminal, when the management OS checks the current remaining battery amount in the user terminal and detects that the current amount is below the registered threshold value, the management OS controls the information in the storage unit in the user terminal.

2. The storage system according to claim 1, wherein the management OS further comprises a restoration module for receiving the input/output information backup from the storage apparatus and restoring the user work OS to its state as of at the backup point in time.

3. The storage system according to claim 2, wherein the management OS further comprises a storage apparatus inquiry module that obtains, by making an inquiry to the management server, the information for the storage apparatus that stores the restoration target input/output information.

4. The storage unit information control system for a user terminal according to claim 1, wherein the management OS further comprises a storage apparatus inquiry function that obtains, by making an inquiry to the management server, the information for the storage apparatus that is going to be a backup destination for the input/output information.

5. The storage system according to claim 1, wherein, with the condition judgment and control module, in the situation where the management server and the user terminal are connected to each other via the network and where the management OS has registered reception of a control command from the management server as a control-triggering condition, when the management OS receives a control command from the management server, the management OS controls the information in the storage unit in the user terminal.

6. The storage system according to claim 1, wherein, with the condition judgment and control module, in the situation where the management server and the user terminal are connected to each other via the network and where the management OS has registered, as a control-triggering condition, detection of a predetermined time being reached, when the management OS compares the current time and the predetermined time and detects that the predetermined time has already passed, the management OS controls the information in the storage unit in the user terminal.

7. The storage system according to claim 6, wherein, with the condition judgment and control module, after the registration of a control-triggering condition, as long as the management server and the user terminal are not connected to each other via the network, the management OS judges the control-triggering condition.

8. The storage system according to claim 1, wherein, with the condition judgment and control module, in the situation where the management server and the user terminal are connected to each other via the network and where the management OS has registered, as a control-triggering condition, detection of a breakdown of communication with the management server, when the management OS cannot communicate with the management server and detects communication breakdown, the management OS controls the information in the storage unit in the user terminal.

9. The storage system according to claim 1, wherein, with the condition judgment and control module, after registration of a control-triggering condition, as long as the management server and the user terminal are connected to each other via the network, the management OS identifies the control-triggering condition.

10. The storage system according to claim 1, wherein the condition judgment and control module deletes, as control for the information in the storage unit, some or all of the pieces of information in the storage unit.

11. The storage unit information control system for a user terminal according to claim 10, wherein, as control for the information in the storage unit, the condition judgment and control module deletes, of the pieces of user work OS-related information stored in the storage unit, the pieces of information other than those backed up in the storage apparatus, or controls the access from the user work OS to those pieces of information.

12. The storage system according to claim 1, wherein the condition judgment and control module executes, as control for the information in the storage unit, access control so that the access from the user work OS to some or all of the pieces of information in the storage unit.

13. The storage system according to claim 1, wherein the condition judgment and control module controls, as control for the information in the storage unit, activation of the user terminal.

14. The storage system according to claim 1, wherein the management OS reports, to the management server, the backup status or control status in the user terminal.

* * * * *